(12) United States Patent
Pfitzenmaier

(10) Patent No.: US 11,788,343 B2
(45) Date of Patent: Oct. 17, 2023

(54) FENESTRATION UNIT WITH ACCESSIBLE IG SPACE

(71) Applicant: Pella Corporation, Pella, IA (US)

(72) Inventor: Paul Martin Pfitzenmaier, Pella, IA (US)

(73) Assignee: Pella Corporation, Pella, IA (US)

( * ) Notice: Subject to any disclaimer, the term of this patent is extended or adjusted under 35 U.S.C. 154(b) by 98 days.

(21) Appl. No.: 17/238,389

(22) Filed: Apr. 23, 2021

(65) Prior Publication Data

US 2021/0332636 A1 Oct. 28, 2021

Related U.S. Application Data

(60) Provisional application No. 63/014,482, filed on Apr. 23, 2020.

(51) Int. Cl.
*E06B 3/28* (2006.01)
*E05C 1/00* (2006.01)

(52) U.S. Cl.
CPC ............. *E06B 3/28* (2013.01); *E05C 1/00* (2013.01); *E05Y 2900/10* (2013.01)

(58) Field of Classification Search
CPC ......... E05C 1/00; E05Y 2900/10; E06B 3/28; E05D 2700/00
USPC .......... 16/193, 196, 205, 221, 231, 232, 277
See application file for complete search history.

(56) References Cited

U.S. PATENT DOCUMENTS

| | | | | |
|---|---|---|---|---|
| 3,612,590 A * | 10/1971 | Andreini | ................ | A47B 47/00 16/221 |
| 5,546,713 A * | 8/1996 | Voegele, Jr. | ............... | E04D 3/08 52/204.597 |
| 5,806,256 A * | 9/1998 | Byrne | ....................... | E06B 3/28 52/656.1 |
| 8,376,019 B2 * | 2/2013 | Van Klompenburg | | ..................... E05C 17/24 160/178.1 R |
| 10,202,797 B1 * | 2/2019 | Header | ............... | E06B 3/26303 |
| 2004/0128924 A1 * | 7/2004 | Kobrehel | ............... | B60J 1/2094 52/203 |

(Continued)

FOREIGN PATENT DOCUMENTS

WO 9000662 1/1990

OTHER PUBLICATIONS

CIPO office action and search report, dated Jun. 12, 2023.

*Primary Examiner* — Roberta S Delisle
(74) *Attorney, Agent, or Firm* — FAEGRE DRINKER BIDDLE & REATH; Victor P. Jonas

(57) ABSTRACT

Various systems and methods are provided for controlling access to the insulated glass space of a fenestration unit. A hinge lug is provided including a lug body having a mounting portion, a cam portion defining a curved cam surface, and a retention portion projecting from the cam portion, and a first retention arm extending from the lug body such that the retention arm is elastically deflectable away from the retention lip. A restrictor link is provided including a restrictor link body having a first end and a second end, wherein the restrictor link body is elastically deflectable, a securing lock positioned proximate the second end, and a cap extending from the securing lock, the cap defining an engaging surface operable to engage the lip channel of the sash. A latch system is provided including a latch base with a ramp access aperture and a latch body including a ramp.

4 Claims, 14 Drawing Sheets

(56) References Cited

U.S. PATENT DOCUMENTS

| | | | |
|---|---|---|---|
| 2006/0021290 A1* | 2/2006 | Kobrehel | B60J 1/001 |
| | | | 52/202 |
| 2016/0208547 A1* | 7/2016 | Champlin | E06B 1/345 |
| 2016/0333633 A1* | 11/2016 | Carrick | E04C 2/38 |
| 2017/0350186 A1* | 12/2017 | Philips | E06B 3/20 |
| 2019/0054705 A1* | 2/2019 | Vaccari | E06B 3/5454 |

* cited by examiner

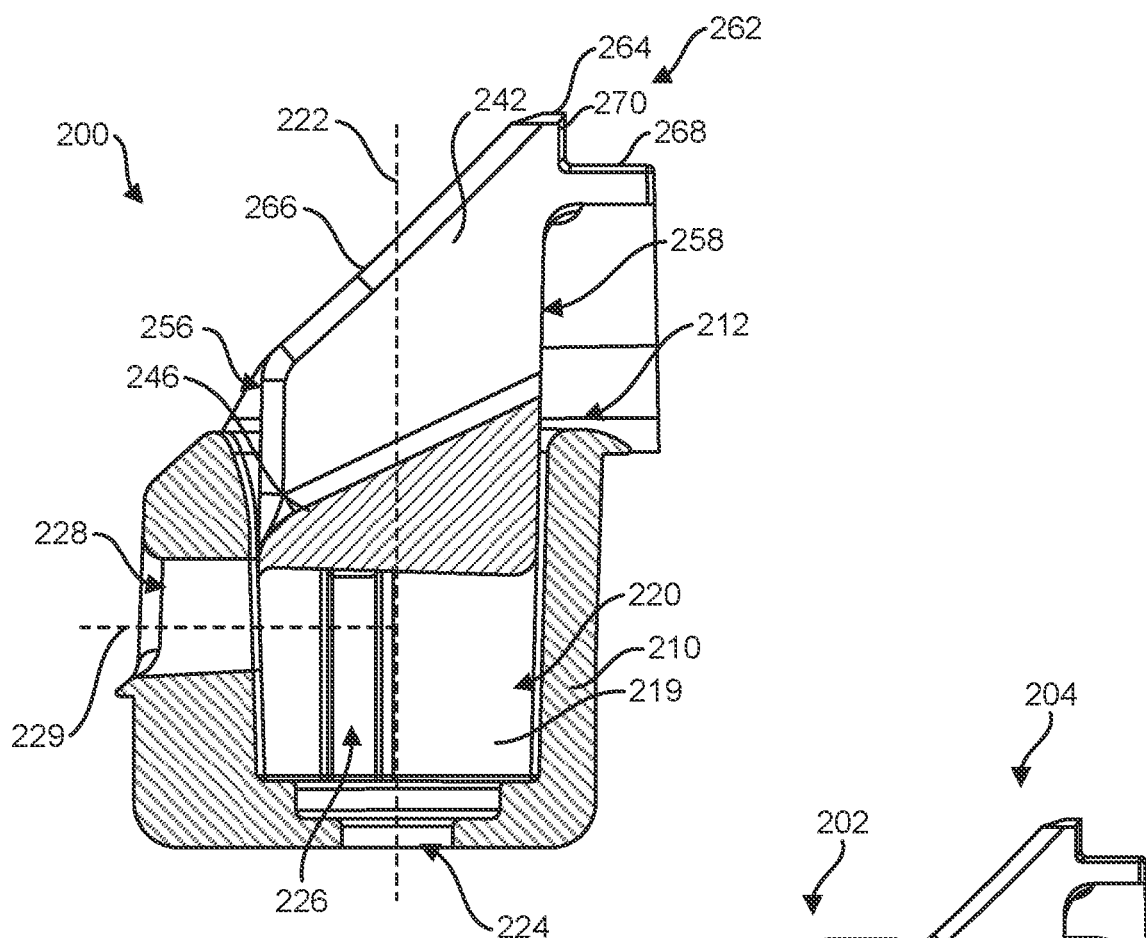
FIG. 12A
FIG. 12B
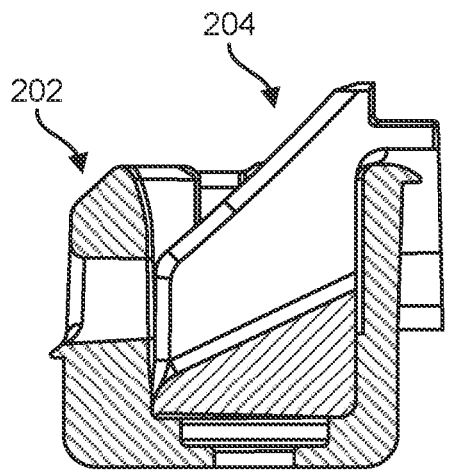
FIG. 12C

FENESTRATION UNIT WITH ACCESSIBLE IG SPACE

CROSS REFERENCE TO RELATED APPLICATION

The present application Provisional Patent Application Ser. No. 63/014,482, filed on Apr. 23, 2020 and titled FENESTRATION UNIT WITH ACCESSIBLE IG SPACE, the entire disclosure of which is hereby incorporated by reference herein.

BACKGROUND

Basic window assemblies traditionally include a frame (the framework that surrounds and supports the assembly, comprised of a head, jambs and a sill) and one or more sashes (a fixed or moveable part of a window that holds the glazing, or glass panels). For enhanced thermal performance, glazing is often in the form of an insulated glass unit, or IG unit for short. An IG unit typically includes two or more sheets, or panes of glazing separated by one or more spacers with sealed space(s) between the two or more sheets of glazing. Air, inert gases, or even vacuum may be present in the sealed space(s) to enhance thermal performance. Traditional IG units are sealed and the space between panes is generally inaccessible.

Designs have been proposed that permit access to an insulating space between panes (e.g., where one or more accessories, such as a blind or other window treatment may be received). For example, Pella Corporation of Pella, Iowa offers "Between-the-Glass" options in which window fashions are tucked between panes of glass. U.S. Pat. No. 8,376,019, issued to Pella Corporation, describes a window assembly having a window frame and at least one primary sash mounted in the window frame. The primary sash has a plurality of sash members forming a primary sash perimeter and a first glazing panel mounted in the primary sash perimeter. At least one secondary sash is pivotally attached directly to the primary sash perimeter along an interior surface thereof so that the secondary sash is rotatably movable between a closed position and an open position relative to the primary sash. The secondary sash has a plurality of secondary sash members forming a secondary sash structure and a second glazing panel mounted in the secondary sash perimeter. An air chamber is located between the primary sash and the secondary sash that is substantially closed to the interior of the building structure.

SUMMARY

Various aspects of the present disclosure are directed toward apparatuses, systems, and methods that relate to improved insulating glass/access assemblies for fenestration units, including windows and doors.

According to one example ("Example 1"), a hinge lug includes a lug body having, a mounting portion, the mounting portion defining a mounting surface, a cam portion opposite the mounting portion, the cam portion defining a curved cam surface, and a retention portion projecting from the cam portion, the retention portion including a retention lip; and a first retention arm extending from the lug body such that the retention arm is elastically deflectable away from the retention lip.

According to another example further to Example 1 ("Example 2"), the hinge lug further includes a second retention arm opposite the first retention arm, the second retention arm being elastically deflectable away from the retention lip, the first retention arm including a first retention finger and the second retention arm including a second retention finger, the first and second retention fingers extending toward one another and being separated by a gap.

According to another example further to Example 1 ("Example 3"), the first retention arm includes a first trunk extending from the lug body and a first finger extending from the first trunk, the first trunk and the first finger extending at an acute angle relative to one another.

According to another example further to Example 3 ("Example 4"), the first trunk has a decreased thickness at a location where the first finger extends from the first trunk relative to a thickness of the first trunk where the first trunk extends from the lug body.

According to another example further to Example 3 ("Example 5"), the first retention finger is elastically deflectable between a first, retention position and a second, receiving position.

According to one example ("Example 6"), a fenestration unit includes a first component of the fenestration unit; a second component of the fenestration unit; and a first hinge lug hingedly coupling the first component to the second component, the first hinge lug including, a lug body having, a mounting portion, the mounting portion defining a mounting surface mounted to one of the first component and the second component, a cam portion opposite the mounting portion, the cam portion defining a curved cam surface configured to be slidably engaged with the other of the first component and the second component during relative, hinged rotation between the second component and first component, and a retention portion projecting from the cam portion, the retention portion including a retention lip for retaining a portion of the other of the first component and the second component to releasably maintain the first component and the second component hingedly coupled, and a first retention arm extending from the lug body and retaining another portion of the other of the first component and the second component such that the retention arm is elastically deflectable away from the retention lip during relative, hinged rotation of the second component and first component to a predetermined hinge angle to release the hinged coupling between the second component and the first component.

According to another example further to Example 6 ("Example 7"), the first component of the fenestration unit is a primary sash and the second component of the fenestration unit is a secondary sash.

According to one example ("Example 8"), a fenestration unit includes a first component of the fenestration unit; a second component of the fenestration unit including a receiver and a lip channel; and a restrictor link operable to engage the second component, the restrictor link including, a restrictor link body having a first end rotatably coupled to the first component of the fenestration unit and a second end, wherein the restrictor link body is elastically deflectable; a securing lock positioned proximate the second end of the restrictor link body and operable to be positioned at least partially in the receiver of the second component; and a cap extending from the securing lock, the cap defining an engaging surface operable to engage the lip channel of the second component.

According to another example further to Example 8 ("Example 9"), the restrictor link further comprises a back rib extending from the restrictor link body proximate the securing lock.

According to another example further to Example 9 ("Example 10"), the first component of the fenestration unit is a primary sash and the second component of the fenestration unit is a secondary sash. wherein the receiver of the secondary sash defines a recess having a recess width, wherein the securing lock includes a securing lock width, and wherein the recess width is less than the securing lock width.

According to another example further to Example 10 ("Example 11"), the back rib is operable to engage the receiver of the secondary sash for positioning the engaging surface of the cap of the restrictor lock in the lip channel of the secondary sash as the restrictor link rotates relative to the receiver of the secondary sash.

According to another example further to Example 8 ("Example 12"), the cap includes a cap surface, and wherein the cap surface is non-parallel with the restrictor link body at the second end of the restrictor link body.

According to another example further to Example 8 ("Example 13"), the cap includes a lip extending from the cap, and wherein the engaging surface is at least partially defined on the lip of the cap.

According to another example further to Example 13 ("Example 14"), the lip terminates in an acute angle.

According to one example ("Example 15"), a latch assembly for securing a sash unit to a frame of a fenestration unit in a closed position is provided, the latch assembly including: a latch base for coupling to a frame of a fenestration unit, the latch base having a latch base body defining a recess oriented about a first axis, the latch base having a first open end and a second end, and the latch base defining a ramp access aperture oriented about a second axis transverse to the first axis; a latch for engaging the sash unit in a closed position, the latch including, a latch body including a ramp having an inclined surface relative to the second axis when installed in the latch base; and a resilient member for biasing the latch body relative to the latch base; wherein latch is operable to translate towards the second end of the recess of the latch base when the ramp is accessed via the ramp access aperture and a threshold force is applied to the ramp of the latch.

According to another example further to Example 15 ("Example 16"), the resilient member includes spring arms extending from the latch body.

According to another example further to Example 15 ("Example 17"), the latch body include first and second side walls extending from the ramp, the first and second side walls having sloped ends operable to contact the sash of the fenestration unit.

According to another example further to Example 15 ("Example 18"), the first and second side walls include engagement portions operable to engage the sash of the fenestration unit and retain the sash in a closed position with the frame when the engagement portions are engaging the sash.

According to another example further to Example 15 ("Example 19"), the latch body is operable to be positioned relative to the latch base in a first, neutral position; a second, latched position; and a third, transitional position.

According to another example further to Example 15 ("Example 20"), the latch further includes an engagement portion for engaging the sash unit.

According to another example further to Example 20 ("Example 21"), the engagement portion of the latch includes a truncated apex.

The foregoing Examples are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

FIGS. 12a-12c are sectional views of a latch system translating between three varying positions, according to some embodiments of the present disclosure;

Figure 1:
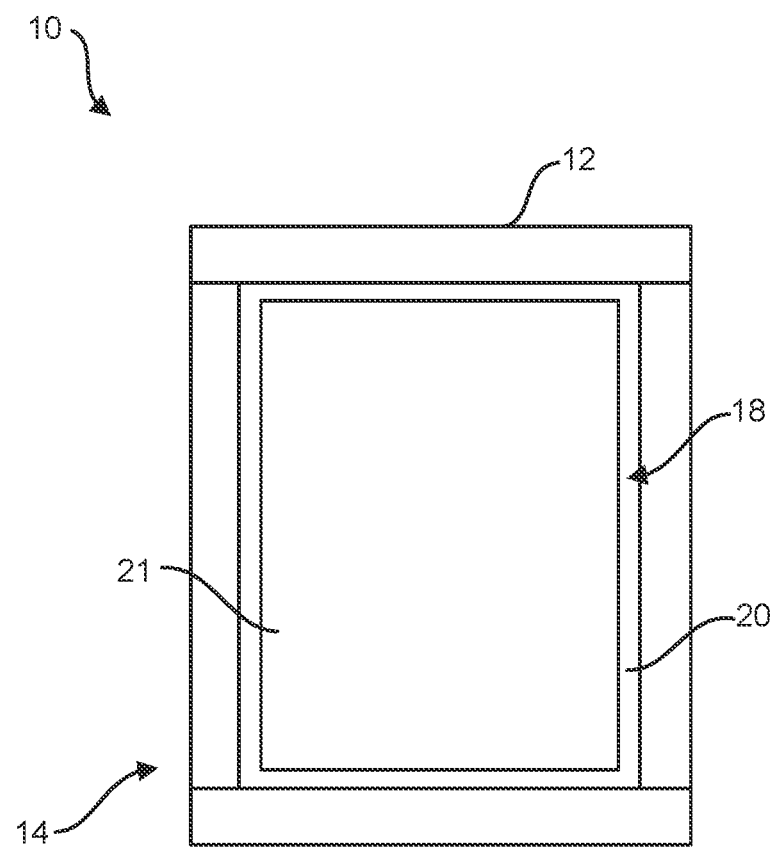
FIG. 1 is a view of a fenestration unit, according to some embodiments of the present disclosure.

It should be understood that the drawings are intended to facilitate understanding of exemplary embodiments of the present invention are not necessarily to scale.

DETAILED DESCRIPTION

The following description refers to the accompanying drawings which show specific embodiments. Although specific embodiments are shown and described, it is to be understood that additional or alternative features are employed in other embodiments. The following detailed description is not to be taken in a limiting sense, and the scope of the claimed invention is defined by the appended claims and their equivalents. Persons skilled in the art will readily appreciate that various aspects of the present disclosure can be realized by any number of methods and apparatuses configured to perform the intended functions.

It should be understood that like reference numerals are intended to identify the same structural components, elements, portions, or surfaces consistently throughout the several drawing figures, as such components, elements, portions, or surfaces may be further described or explained by the entire written specification, of which this detailed description is an integral part. Unless otherwise indicated, the drawings are intended to be read (for example, cross-hatching, arrangement of parts, proportion, degree, etc.) together with the specification, and are to be considered a portion of the written description.

This disclosure is not meant to be read in a restrictive manner. For example, the terminology used in the application should be read broadly in the context of the meaning those in the field would attribute such terminology.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only unless otherwise dictated by the context in which they are used. For example, words such as "top", "bottom", "upper," "lower," "left," "right," "horizontal," "vertical," "upward," and "downward" merely describe the configuration shown in the figures or the relative orientation of parts. The referenced components may be oriented in a variety of directions. Similarly, throughout this disclosure, where a process or method is shown or described, the method may be performed in any order or simultaneously, unless it is clear from the context that the method depends on certain actions being performed first.

Descriptions of the Various Embodiments

Various examples relate to system components and associated methods for providing and controlling access to a closed space between glazing of a fenestration unit. In some examples, such systems and methods are configured to provide simplified and reliable access to an accessible, insulated glass space by providing hinge lug, a restrictor link, and/or a push latch, each of which can be used independently or in connection with the others. As each component can be used independently of the others, they will be discussed separately in more detail. Each component relates to a fenestration unit generally, and though an exemplary fenestration unit is described in various examples it should be understood that similar principles apply to any of a variety of fenestration units, including windows as well as doors.

FIG. 1 is a front view of a fenestration unit 10, in accordance with an embodiment. The fenestration unit 10 generally includes a frame 12 and has an interior side 14 and an exterior side (not shown) opposite the interior side. The interior side 14 can be arranged, for example, toward an interior of a building or room and the exterior side 16 can be arranged toward an exterior of a building or room. The fenestration unit 10 also includes a sash assembly 18 including a primary sash 20 and a secondary sash 22 coupled to primary sash 20. The primary sash 20 supports primary glazing 21 and the secondary sash 22 supports secondary glazing 23. One or more of the primary and secondary glazing 21, 23 may be transparent, translucent, opaque and combinations thereof. In various examples, the primary and secondary glazing include clear, transparent glass.

Figure 2:
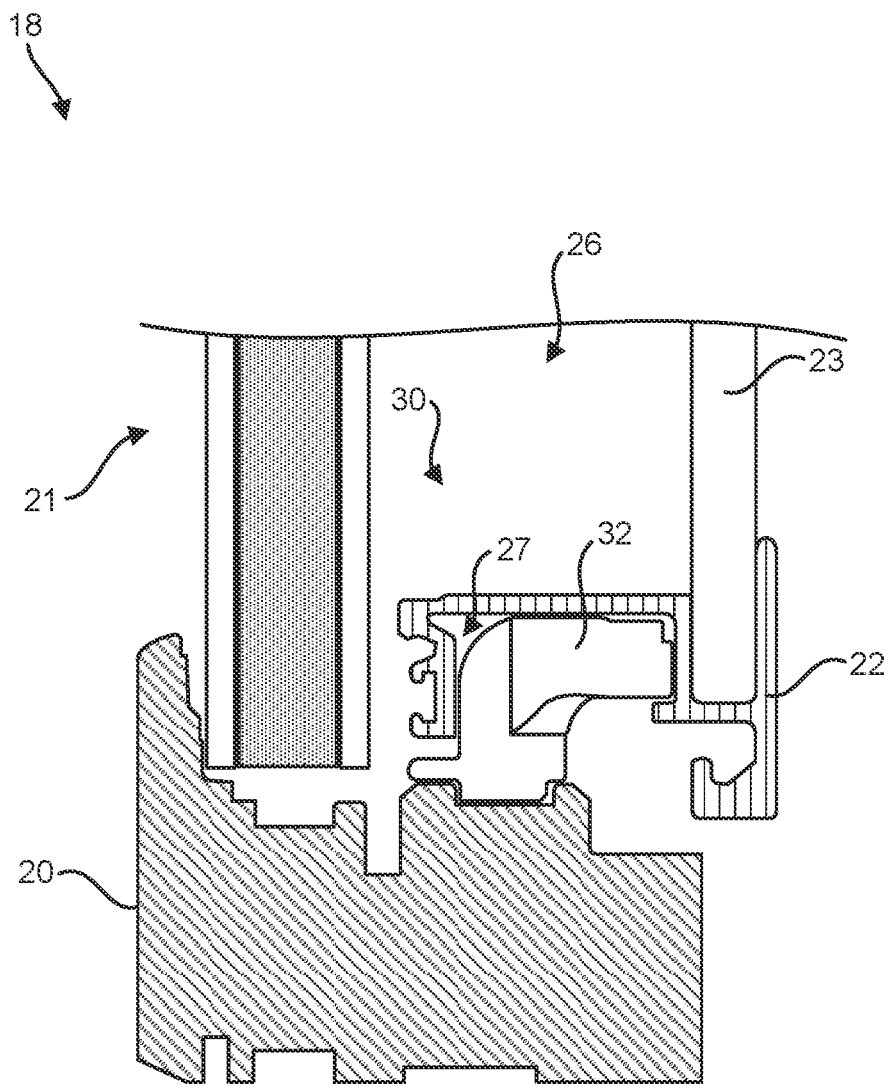
FIG. 2 is a sectional side view of a fenestration unit and a hinge lug system, according to some embodiments of the present disclosure.

FIG. 2 is a partial, sectional view of the sash assembly 18 according to various examples. As shown, the primary sash 20 has primary glazing 21 that includes one or more glazing panels (e.g., glass panes) sealed together in the form of an IG unit. Although multiple glazing panels are shown, the primary glazing 21 may include a single glazing panel according to various examples. The secondary glazing 23 is shown including a single glazing panel, though similarly to the primary glazing 21 one or more glazing panels may be incorporated into the secondary glazing 23. As described in greater detail below, the primary and second glazing 21, 23 define a closed space 26, or compartment that is openable, or accessible. In some implementations, one or more window accessories, such as a window treatment (e.g., blind or shade assembly) is installed in the closed space 26. The closed space 26 may be sealed to varying degrees so that the closed space 26 provides insulating functionality (e.g., by virtue of the trapped air in the closed space 26).

Although the fenestration unit 10 shown in FIG. 1 is generally described in the context of a fixed window or casement window, the same principals can be applied to other types of fenestration units and their associated sashes, including double hung windows, for example.

Hinge Lug

The insulative properties of a fenestration unit 10 may be augmented by the incorporation of spaces between fenestration unit glazing. These spaces may act as thermal barriers to heat transfer through the fenestration unit 10 and specifically through the associated glazing panels. Additionally or alternatively, these spaces may provide a location for window accessories, such as window treatments (e.g., blinds, shades, or screens). Referring to FIG. 2, the fenestration unit 10 is shown to include primary and secondary glazing 21, 23. The primary glazing 21 may be facing the exterior of a building or room and the secondary glazing 23 may be facing the interior of a building or room. The primary and secondary glazing 21, 23 create or define a closed space 26. However, it may be advantageous to maintain the ability to access the closed space 26, for example in order to provide service to portions of the fenestration unit 10. This may be accomplished via a hinge system.

As shown in FIG. 2, the primary sash 20 includes frame portion 25 (see FIG. 14) and a hinge lug 32 while the secondary sash 22 includes a hinge catch 27 or receiver that is configured to be rotatably and releasably couple to the hinge lug 32. The hinge lug 32 and the hinge catch 27 combine to define a hinge system 30 between the primary sash 20 and the secondary sash 22, and about which the secondary sash 22 is free to rotate relative to the primary sash 20.

The hinge lug 32 may be secured to the frame portion 25 of the primary sash 20, where the hinge lug 32 is operable to couple to the primary sash 20 in a rotatable and removable engagement, which allows access to the closed space 26 between the primary and secondary glazing 21, 23 of the sash assembly 18.

Figure 3:
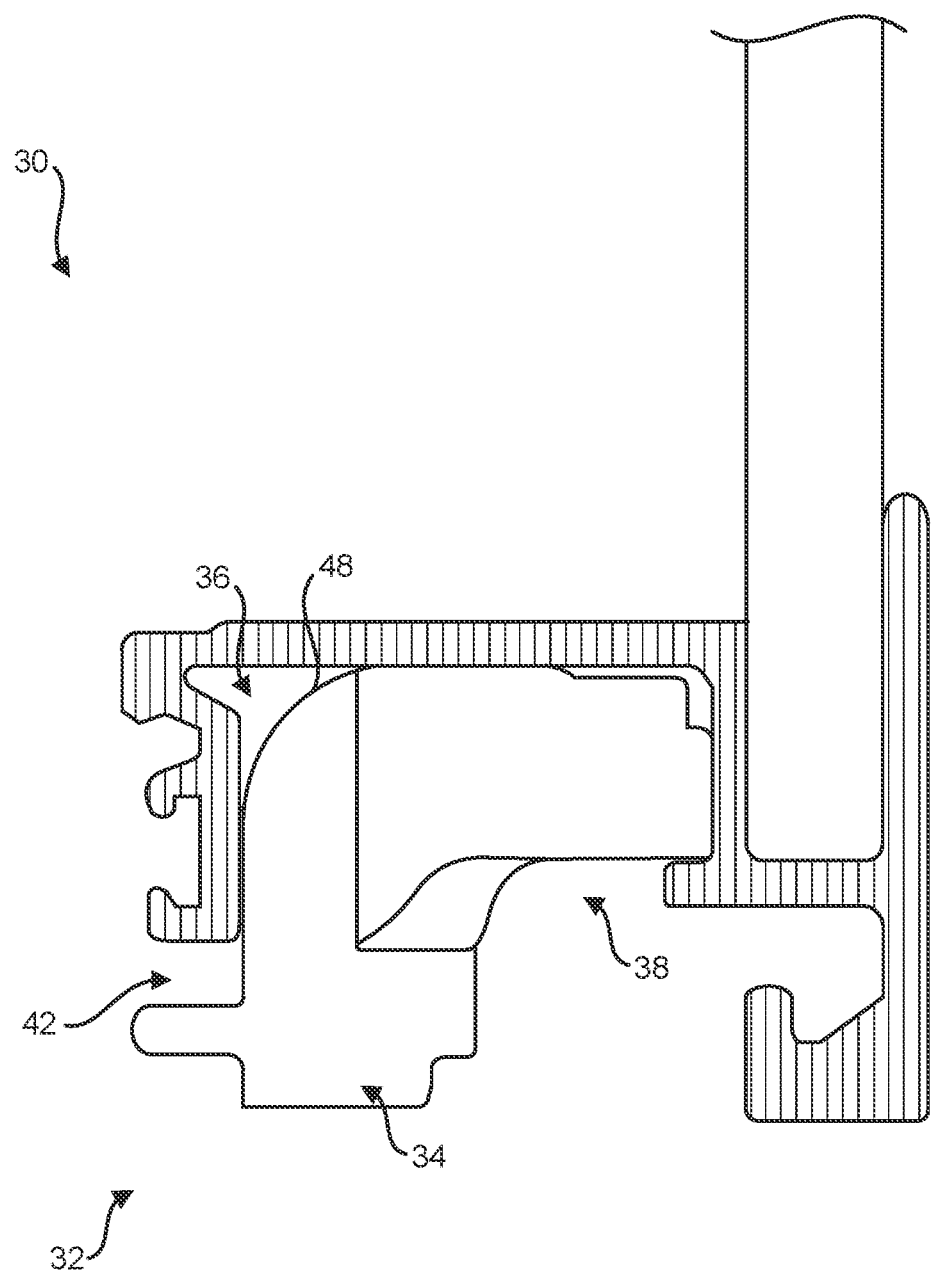
FIG. 3 is a sectional side view of a sash assembly installed on a hinge lug, according to some embodiments of the present disclosure.

Referring now to FIG. 3, the hinge system 30 is provided, including a cross section of the secondary sash 22 of the sash assembly 18 and a side view of the hinge lug 32. The components of the hinge system 30 are operable to pivot, rotate, and translate relative to each other as a result of the various features that will be discussed herein.

Figure 4:
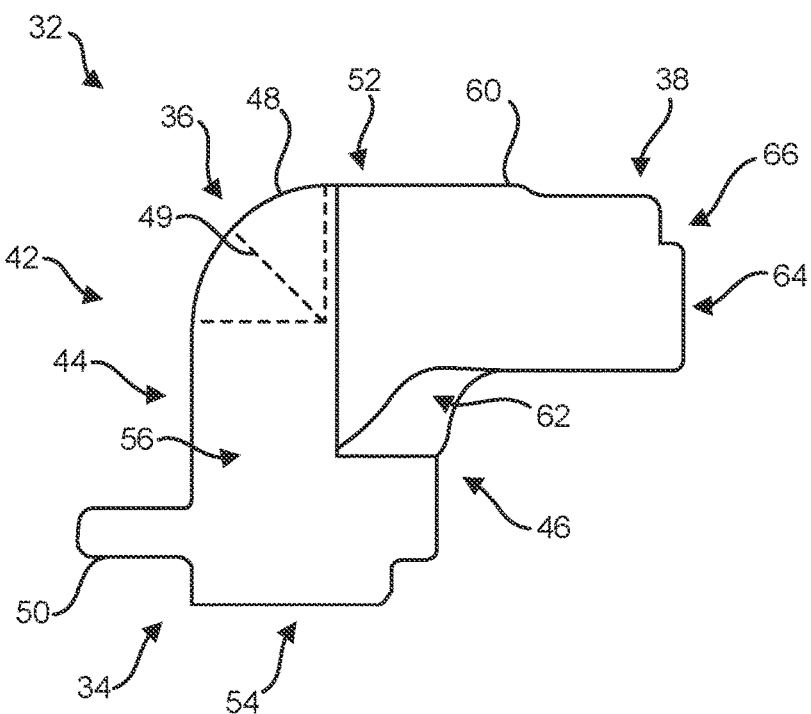
FIG. 4 is a side view of a hinge lug, according to some embodiments of the present disclosure.
Figure 5:
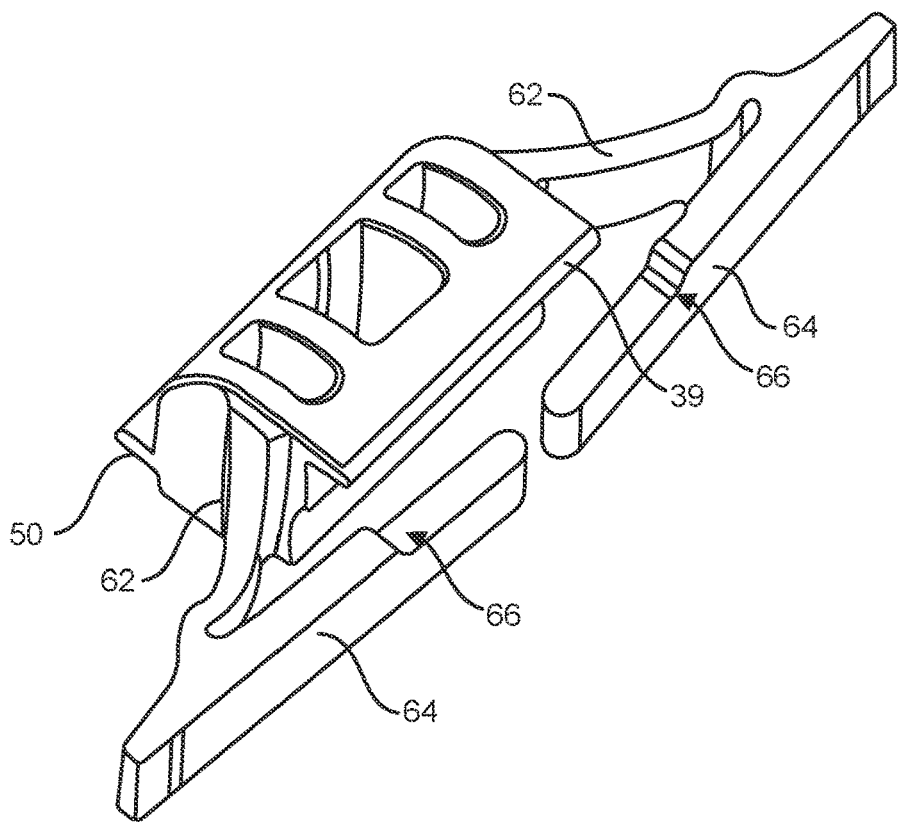
FIG. 5 is a perspective view of a hinge lug, according to some embodiments of the present disclosure.

Referring to FIGS. 4 and 5, the hinge lug 32 may comprise a lug body 42 having mounting portion 34, a cam portion 36, and a retention portion 38. The mounting portion 34 may define a mounting surface operable to mount to a portion of the primary sash 20. The cam portion 36 may be positioned opposite the mounting portion 34 and may define a curved cam surface 48. The curved cam surface may be configured to interface with the secondary sash 22 of the sash assembly 18.

In one embodiment, the lug body 42 may include a first side 44 and a second side 46. The first side 44 or at least a portion of the first side 44 may include a curved profile or curved cam surface 48. The lug body 42 may have an intersection where the first side 44 and a top side 52 meet. The intersection may include a curved cam surface 48 that connects the first side 44 to the top side 52 of the hinge lug 32. The lug body 42 also includes a bottom side 54 opposite the top side 52. The bottom side 54 of the lug body 42 is received by the lug recess 28 of the primary sash 20.

The curved cam surface 48 of the lug body 42 extends along a predefined arc length having a predefined radius 49. The arc length of the curved surface may be such that there is no clearly defined boundary between the top side 52 and the first side 44 of the lug body 42. This means that a substantial portion of the surface area of the top side 52 and/or the first side 44 may comprise the curved cam surface 48 of the lug body 42. In other embodiments, the curved cam surface 48 represents a defined transition point or junction between surfaces of the top side 52 and the first side 44. The curved cam surface 48 may be a bezel or a rounded corner of the lug body 42 at the intersection of surfaces on the first side 44 and the top side 52 of the lug body 42.

The bottom side 54 may include structure operable to interface with the primary sash 20, such as the mounting portion 34. As different frames 12 may have varying shapes and profiles, the mounting portion 34 may be shaped to appropriately interface with the primary sash 20 and the lug recess of the primary sash 20. In some embodiments the hinge lug 32 may include a flange 50 extending from the lug body 42. The flange 50 may extend from the first side 44 proximate the bottom side 54 of the lug body 42. The flange 50 may provide additional support of the hinge lug 32 on the primary sash 20, and specifically may provide enhanced engagement with the primary sash 20 to reduce rotational movement of the hinge lug 32 when secured to the primary sash 20.

The lug body 42 may also include a retention portion 38. The retention portion may project from the cam portion 36. The retention portion 38 may include a retention lip 39. The retention lip 39 may be operable to engage with the secondary sash 22 of the sash assembly 18. The retention lip 39 may by positioned flush with the top side 52 of the lug body 42 and extend out from the second side 46. Thus, then the retention lip 39 is engaged with a corresponding feature, relative vertical movement is restricted.

The lug body 42 further comprises two lateral sides 56, 58 from which retention arms 60 may extend. The retention arms 60 may include a first retention arm and a second retention arm, each having a trunk portion 62 and a locking portion or a retention finger 64. The trunk portion 62 may extend directly from the lateral sides 56, 58 of the lug body 42 at a 90-degree angle. However, in some embodiments, the trunk portion 62 may extend from the lug body 42 at an angle greater than 0 degrees and less than 90 degrees, such that the retention fingers 64 of the retention arms 60 are located at, near, or past a plane defined by the second side 46 of the lug body 42. The trunk portion 62 may also be curved to allow for this position or placement of the retention finger 64 of the retention arm 60. The trunk portion 62 may also be reinforced either by having additional support structures or being formed of more material such that the retention arm is thicker at the lug body 42 than at the retention finger 64. The trunk portion 62 may be thicker at a location where the retention arm 60 extends from the lug body 42 and a decreased relative thickness where the retention finger 64 extends from the trunk portion 62. It will be noted that the retention arms 60 and specifically the trunk portion 62 may comprise a flexible and elastic material which allows the retention arms 60 to deflect under the application of force and to return to a neutral position when no force is being applied. The trunk portion 62 may be curved to provide resilience and/or spring to the retention arms 60 when the retention arms 60 are deflected. The curve of the retention arms 60 may be specifically tailored to withstand and accommodate the movements, deflections, and rotations that retention arms 60 will experience during normal use of the hinged fenestration unit 10.

The retention arms 60 also include retention fingers 64. The retention fingers 64 may extend from the trunk portions 62 such that the retention fingers 64 have surfaces substantially parallel to the second side 46 of the lug body 42. The retention fingers 64 may extend from the trunk portion 62 at an acute angle relative to the trunk portion. The portion where the retention fingers 64 and the trunk portion 62 may be configured to promote deflection and flexion of the retention fingers 64 relative to the trunk portion 62. For example, the retention fingers 64 may flex or deflect relative to the trunk portions 62 such that the angle defined between the trunk portions 62 and the retention fingers 64 increases and decreases. The retention fingers 64 and/or the trunk portions 62 may also be configured to flex in a plane transverse to the angle formed between the trunk portion 62 and the retention finger 64. Thus, the retention fingers 64 may be deflectable between a first, retention position; a second, receiving position; and a third, release position.

In some embodiments, trunk portions 62 may connect to the retention fingers 64 at a position between the first and second ends of the retention fingers 64. In some embodiments, this means that the position at which the trunk portions 62 and the retention fingers 64 connect form both an acute angle and an obtuse angle. In other embodiments, the portion where the two components connect form a right angle. However, this portion where the two components connect being positioned between first and second ends of each of the retention fingers 64 may provide desirable deflection and flexion of the device during use. In some embodiments, the various retention fingers 64 are positioned relative to each other such that they extend toward one another and are separated by a gap.

The retention fingers 64 may include a surface or multiple surfaces with features for retaining and locking the hinge lug 32 to the secondary sash 22 of sash assembly 18. The retention fingers 64 may also include lip recess 66. The lip recess 66 is operable to be positioned with the retention lip 39. The lip recess 66 of the retention fingers 64 extends at least the length of the retention lip 39, allowing the retention lip 39 to be positioned at least partially within the lip recess 66 of the retention fingers 64. Each retention finger 64 may include a section of the lip recess 66, such that the combination of the various sections comprise the lip recess 66.

This allows for the individual retention fingers 64 to operate independent from one another while still providing a position in which the lip recess 66 may be positioned. In some embodiments, the retention arms 60 are elastically deflectable away from the retention lip 39.

As can be seen in FIG. 5, the retention arms 60 may further include steps 65 extending outward from the retention fingers 64 at ends spaced away from the body of the hinge lug 32. The steps 65 are operable to facilitate coupling and retention of the retention arms 60 within the corresponding structure. Because the retention arms 60 are flexible, the steps 65 help facilitate the coupling by engaging when the flexible nature might otherwise deflect the ends away from a coupling position.

Figure 6:
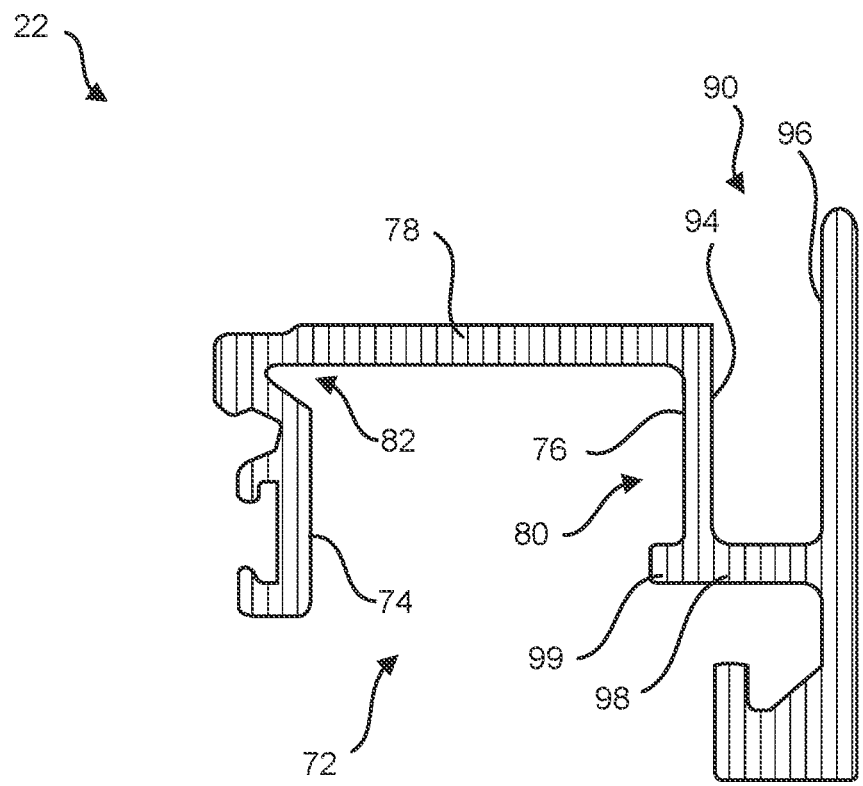
FIG. 6 is a sectional side view of a sash, according to some embodiments of the present disclosure.

Now referring to FIG. 6, a secondary sash 22 is provided that is configured such that the hinge lug 32 and the secondary sash 22 are operable to interface with each other. Specifically, the secondary sash 22 includes an accessory receiver 72 which is operable to receive the hinge lug 32. The accessory receiver 72 may be a U-shaped channel which is operable to secure the hinge lug 32 at the first side 44, the second side 46, and the top side 52. The accessory receiver 72 may include a first side wall 74, a second side wall 76, and a cross-member 78. The cross-member extends between the first side wall 74 and the second side wall 76 and is therefore transverse to those side walls 74, 76. When the hinge lug 32 and the accessory receiver 72 are interfaced, the first side 44 of the hinge lug 32 is interfaced with the first side wall 74 of the accessory receiver 72, the second side 46 of the hinge lug 32 is interfaced with the second side wall 76 of the accessory receiver 72, and the top side 52 of the hinge lug 32 is interfaced with the cross-member 78 of the accessory receiver 72.

The secondary sash 22 also includes a panel receiver 90 which provides a securing area for a primary glazing 21 to be received. The panel receiver 90 may be a U-shaped channel which is able to secure the primary glazing 21 at edges of the primary glazing 21. The panel receiver 90 may include a first side wall 94, a second side wall 96, and a cross-member 98. The cross-member 98 extends between the first side wall 94 and the second side wall 96 and is therefore transverse to those side walls 94, 96.

In some embodiments, the cross-member 98 of the panel receiver 90 extends beyond the second side wall 76 of the accessory receiver 72, this portion being called the extension portion 99. The extension portion 99 of the cross-member 98 of the panel receiver 90 extending beyond the second side wall may provide for a locking recess 80 defined by the extension portion 99, the second side wall 76 of the accessory receiver 72, and the cross-member 78 of the accessory receiver 72. In alternative embodiments, the locking recess 80 may be defined in the second side wall of the accessory receiver 72.

The locking recess 80 is operable to receive and interface with the retention finger 64 of the of the retention arm 60 of the accessory receiver 40. Thus, the locking recess 80 retains the retention finger 64 of the retention arms 60 when the two are interfaced. The retention finger 64 will provide resistance to the decoupling of the retention finger 64 and the locking recess 80 until a predetermined force is applied at a predetermined angle.

As previously discussed, the secondary sash 22 and the hinge lug 32 cooperate and interface with each other to allow the secondary sash 22 to pivot relative to the primary sash 20. The hinge lug 32 differs from many traditional hinge designs as can be seen and provides certain features that may not be possible with a traditional hinge design. To understand how the hinge lug 32 and the secondary sash 22 provide for a hinged function to a fenestration unit 10, the relationship between the two components will be discussed in greater detail.

When the hinge lug 32 is mounted to the primary sash 20 of a fenestration unit 10, a secondary sash 22 may be installed onto the primary sash 20 via the hinge lug 32. The secondary sash 22 may be placed onto the hinge lug 32 such that the accessory receiver 72 of the secondary sash 22 receives at least a portion of the hinge lug 32. When the secondary sash 22 is fully installed on the hinge lug 32, the cross-member 78 rests on or is proximate to the top side 52 of the lug body 42. Thus, at least a portion of the lug body 42 is positioned inside of the accessory receiver 72 of the secondary sash 22. The retention arms 60 are also positioned inside the accessory receiver 72. In some embodiments a retention finger 64 of the retention arms 60 engage a locking recess 80 of the secondary sash 22. The locking recess 80 is operable to retain the retention finger 64 of the retention arms 60 using a variety of methods and structures (e.g., interference fit, tongue and grove, snap-fit joints, annular snap-fit joints, cantilever snap joints, etc.).

When the retention fingers 64 are engaged in the locking recess 80 of the sash, the retention fingers 64 may be positioned against the second side wall 76. The retention fingers 64 may also be positioned against the extension portion 99 and the cross-member 78, which are operable to prevent the secondary sash 22 from translating away from the hinge lug 32. In some embodiments, the lip 39 provides stability to the retention fingers 64 when installed. The lip 39 may be rigid and may be positioned in the lip recess 66 of the retention fingers 64, thus limiting movement of the retention fingers 64 within the locking recess 80 and consequently limiting movement between the secondary sash 22 and the hinge lug 32.

Figure 7A:
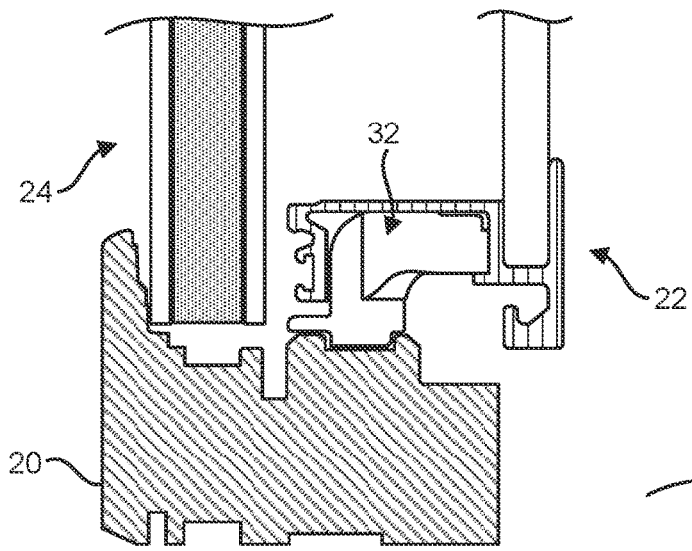
FIGS. 7a-7c are side views of a sash assembly being pivoted open an uninstalled from a hinge lug, according to some embodiments of the present disclosure.
Figure 7B:
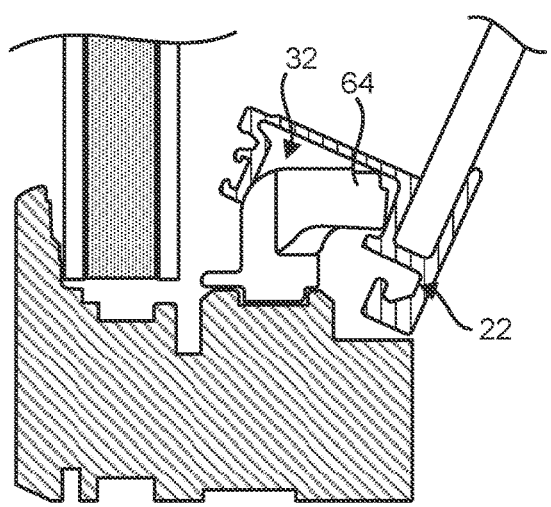
Figure 7C:
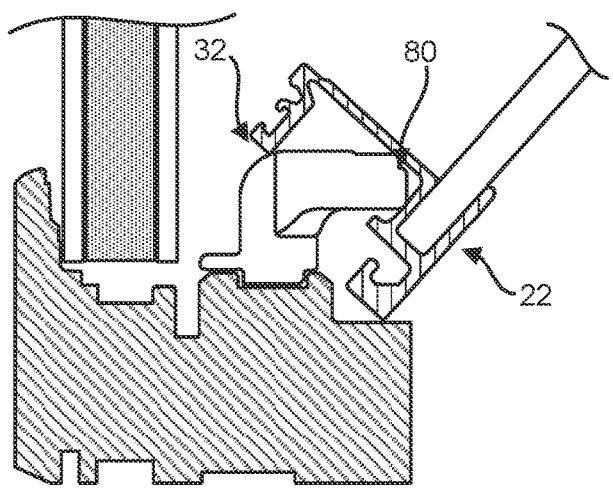

As can be seen in FIGS. 7a-7c, in some embodiments, the hinge lug 32 allows for the secondary sash 22 of the sash assembly 18 to rotate away from the primary sash 20. When the secondary sash 22 is rotated away from the primary sash 20, the flexible retention fingers 64 are able to deflect which allows the secondary sash 22 to pivot relative to the hinge lug 32. The retention fingers 64 also may remain engaged or partially engaged with the locking recess 80 which provides stability to the secondary sash 22 as it is pivoted open and closed. As the secondary sash 22 is rotated beyond a threshold position, the secondary sash 22 releases the hinge lug 32 and the secondary sash 22 can be lifted or translated away for removal. In some embodiments, the hinge lug 32 is configured to be released from the secondary sash 22 when the secondary sash 22 is rotated away from the closed position beyond approximately 20 degrees, approximately 25 degrees, approximately 30 degrees, approximately 35 degrees, approximately 40 degrees, approximately 45 degrees, approximately 50 degrees, approximately 55 degrees or any range between and including any of the foregoing values.

As shown, the hinge lug 32 includes a curved cam surface 48 on the lug body 42. The curved cam surface 48 allows the secondary sash 22 and specifically the first side wall 74 to translate along the curved cam surface 48. During rotational movement of the secondary sash 22, the curved surface reduces the stress to the secondary sash 22 which might otherwise cause deflection and bending of the first and second side walls 74, 76 of the secondary sash 22. The radius 49 of the curved cam surface 48 may be varied in order to provide a smoother translation along the curved cam surface 48 as the secondary sash 22 is pivoted open. It will be noted that the secondary sash 22 may not have a traditional pivot point in some embodiments. For example, the secondary sash 22 may pivot about an axis that is spaced from the secondary sash 22. In some embodiments, this may be a result of the pivot axis being defined by the hinge lug 32 and the curved cam surface 48. Thus, as the secondary sash 22 is being opened or closed, the secondary sash 22 may translate away from the pivot axis. Thus, the pivot axis of the secondary sash 22 may be considered a variable or translational pivot axis in relation to the secondary sash 22, which allows the secondary sash 22 to translate slightly outward as it is rotated from a closed position.

Furthermore, in some embodiments, the engagement between the hinge lug 32 and the secondary sash 22 may require translational movement in order to permit the secondary sash 22 to be fully opened without the hinge lug 32 and the secondary sash 22 interfering with each other or causing bending and deflection of either of the components.

Thus, in some embodiments, the hinge system 30 described herein may be implemented to provide a hinged engagement in fenestration units, and more specifically may be implemented to provide hinged access to insulated glass spaces.

Restrictor Link

Turning now to a discussion of a restrictor link, it may be advantageous to restrict the distance an secondary sash 22 may be opened when providing access to the closed space 26, for example, to prevent accidental disconnection of the secondary sash 22 from the primary sash 20, to prevent over extension of the hinge, and/or to provide a fail-safe for large or heavy panels when gaining access to the closed space 26, for example.

Figure 8:
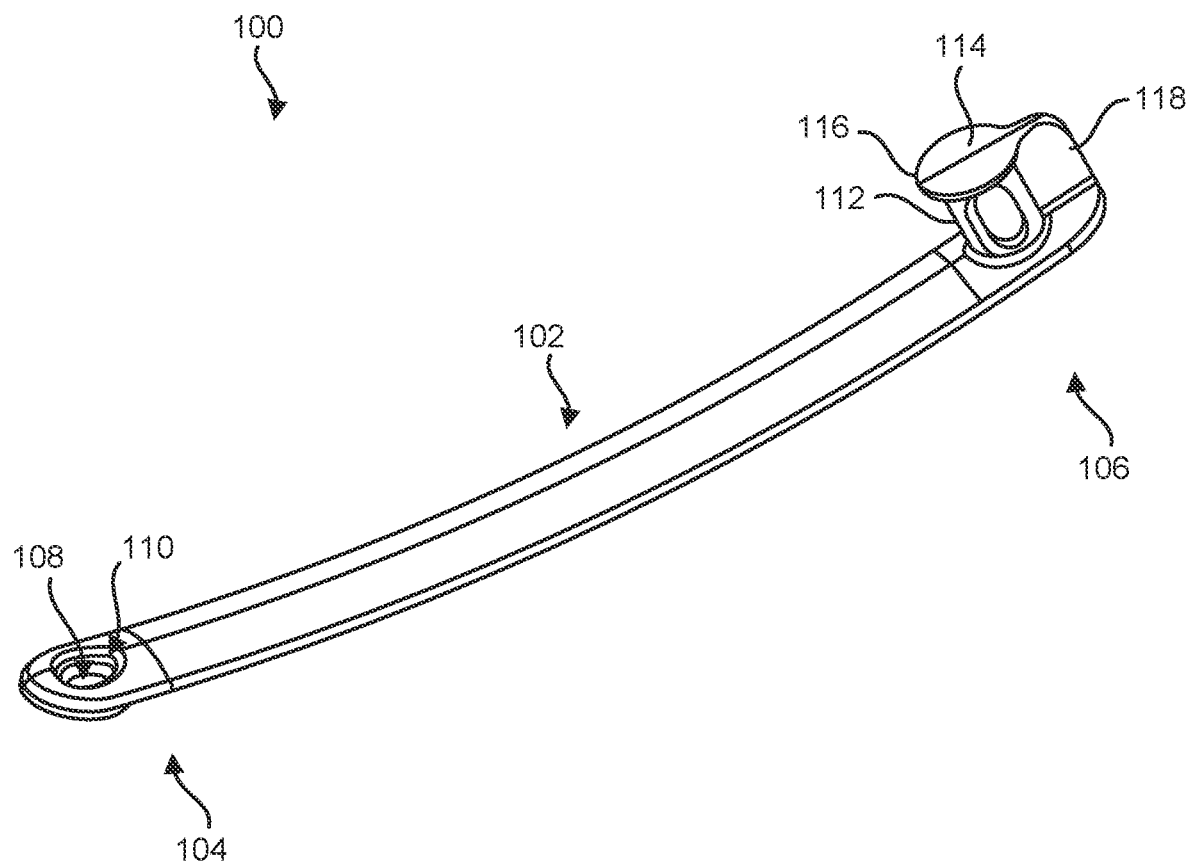
FIG. 8 is a perspective view of a restrictor lock, according to some embodiments of the present disclosure.

Referring now to FIG. 8, one example of a restrictor link 100 is shown. When sash assembly 18 is implemented on fenestration unit 10, a restrictor link 100 may be implemented to prevent the secondary sash 22 from opening more than a specified distance once the secondary sash 22 has been unlatched. When implemented with the previously discussed hinge lug 32, the restrictor link 100 limits the secondary sash 22 from opening to the point that it can be lifted off and come free from the primary sash 20.

The restrictor link 100 includes a restrictor link body 102 having a first end 104 and a second end 106. The restrictor link body 102 may include a thin profile. The first end 104 is operable to rotatably couple to the primary sash 20 of a fenestration unit 10. The second end 106 of the restrictor link 100 includes a securing lock 112 for coupling to the secondary sash 22 of a sash assembly 18. The securing lock 112 extends from the second end 106 of the restrictor link body 102 of the restrictor link 100. The securing lock 112 includes a cap 114. The cap 114 is positioned on top of or extending from the securing lock 112. The cap 114 includes a lip 116 extending radially outward from the cap 114, the lip 116 may include an overhanging surface.

The first end 104 of the restrictor link 100 may couple or attach to the primary sash 20 in a variety of methods that will be known to one of skill in the art. In one embodiment, the restrictor link 100 is coupled to the primary sash 20 using a screw. The first end 104 of the restrictor link 100 may include an aperture 108 through which a portion of the screw may pass in order to engage with the primary sash 20. Additionally, the first end 104 may include a screw recess 110 that is positioned in axial alignment with the aperture 108. The screw recess 110 allows a head of the screw to be seated in the screw recess 110 when the screw is engaging the restrictor link 100 and the primary sash 20. Thus, the restrictor link 100 can be in a rotatable engagement with the primary sash 20, where the first end 104 restrictor link 100 rotates about the screw.

The securing lock 112 is operable to be received by the accessory receiver 72 of the secondary sash 22. Thus, when the first end 104 of the restrictor link 100 is secured to the primary sash 20 and the second end 106 of the restrictor link 100 is secured to the secondary sash 22, the restrictor link 100 prevents the secondary sash 22 from translating away from the primary sash 20 beyond a predetermined distance as the restrictor link 100 rotates outward with the sash assembly 18. For example, a secondary sash 22 may be coupled to a primary sash 20 in a hinged engagement in order to allow access to the closed space 26. The restrictor link 100 may be installed on the secondary sash 22 opposite from where the secondary sash 22 is coupled to the primary sash 20. The restrictor link 100 is operable to prevent the secondary sash 22 from rotating relative to the primary sash 20 beyond a certain distance, or in other terms, prevents relative rotation about the hinge axis beyond a predetermined arc length.

With reference to FIG. 8, the cap 114 includes a lip 116 operable to bind inside, or otherwise be retained inside of the accessory receiver 72 when the secondary sash 22 is opened a predetermined distance in order to prevent accidental disconnection of the restrictor link 112 from the secondary sash 22. In order for the lip 116 to bind or hook in the accessory receiver 72 of the secondary sash 22, the accessory receiver includes a lip channel 82, as shown in FIG. 6. The lip channel 82 may be positioned on the first side wall 74 of the accessory receiver 72. Thus, when the lip 116 is engaged with the lip channel 82, the securing lock 112 cannot be removed from the accessory receiver 72. In some embodiments, the cap 114 may be positioned on the securing lock 112 such that the cap is non-parallel with restrictor link body 102, and more specifically, the restrictor link body 102 proximate the securing lock 112.

The restrictor link 100 may also include a back rib 118 extending from the second end 106. The back rib 118 may be positioned transverse to the restrictor link body 102 and along a portion of the longitudinal length of the restrictor link 100. The back rib 118 may also extend from of be coupled to the securing lock 112.

Figure 9:
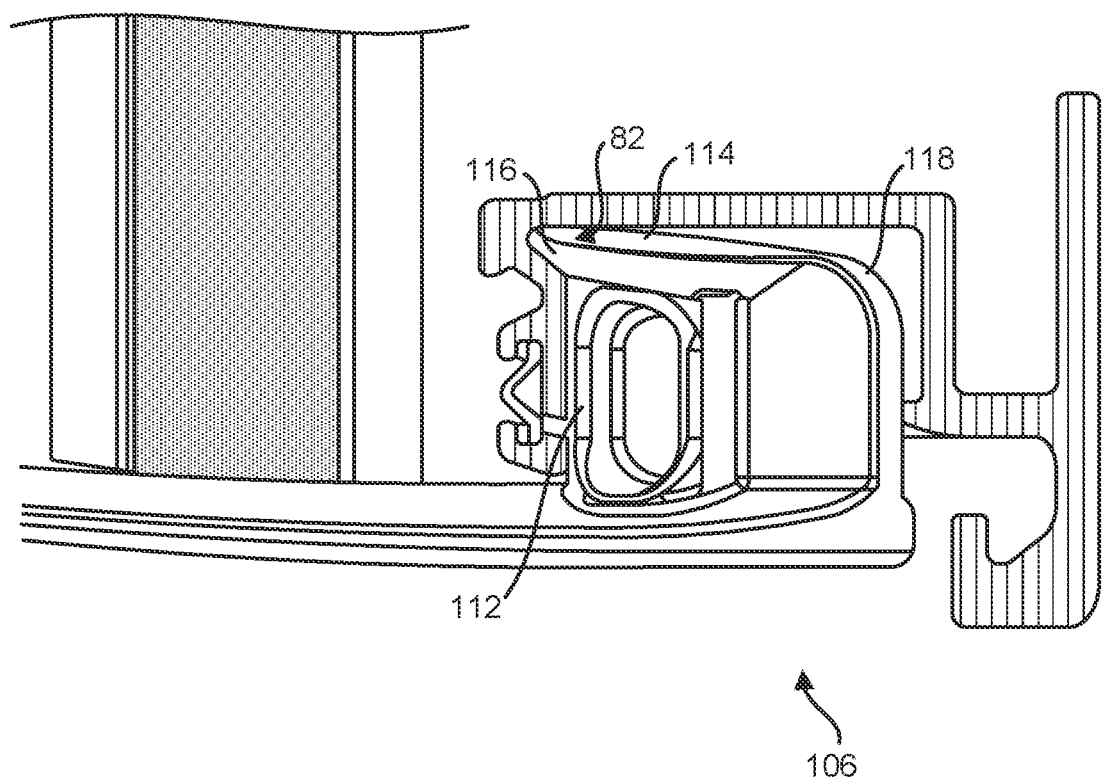
FIG. 9 is a side view of a restrictor link engaged with a sash, according to some embodiments of the present disclosure.
Figure 10A:
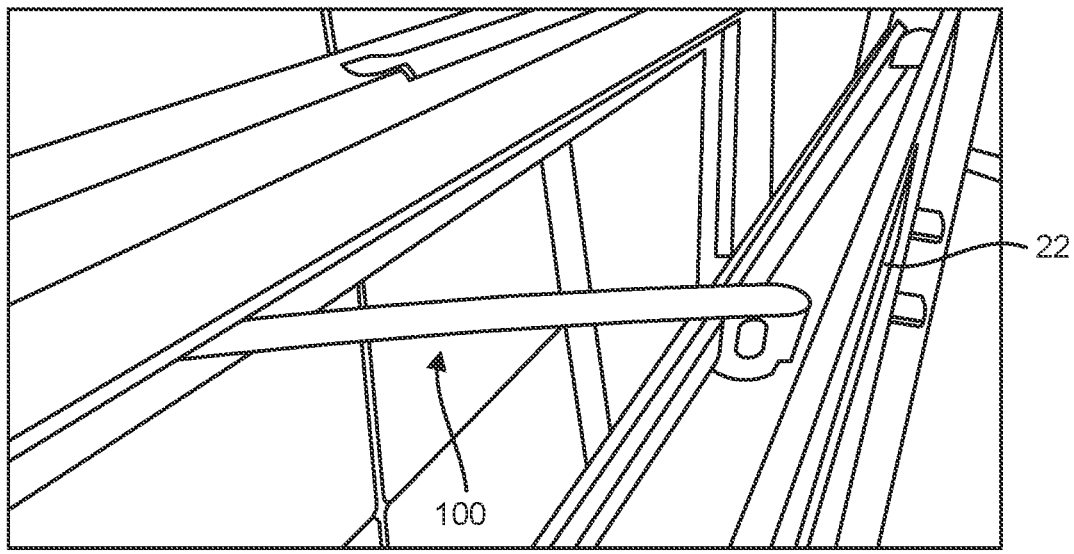
FIGS. 10a and 10b are perspective views of a restrictor link installed in and being uninstalled from a sash assembly, according to some embodiments of the present disclosure.
Figure 10B:
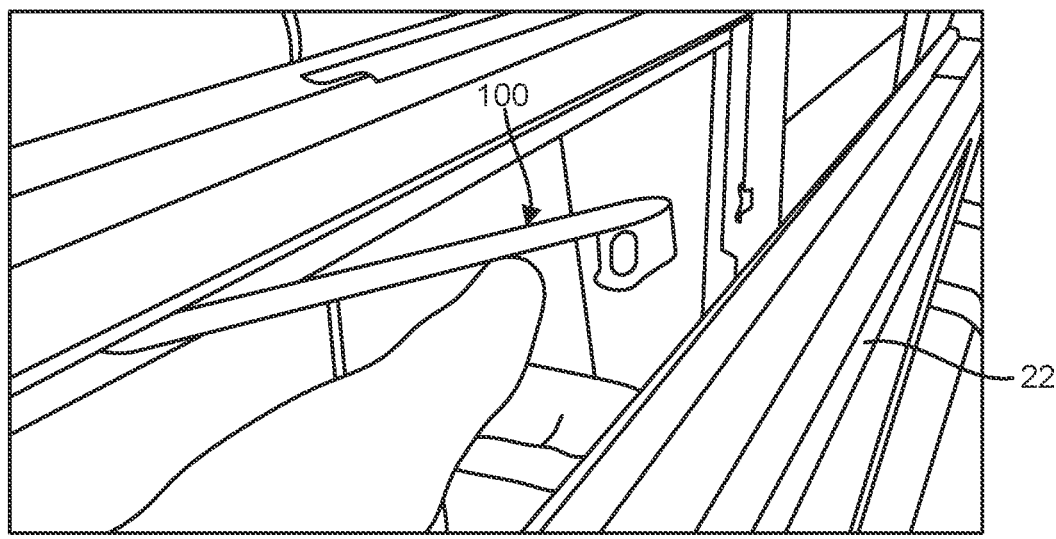

As can be seen in FIGS. 9-10*b*, in some embodiments, in order for the lip 116 to engage the lip channel 82 (also shown in FIG. 6), the relative position of the securing lock 112 in relation to the accessory receiver 72 must be changed. The relative position of the two components may be altered by the opening and closing of the secondary sash 22. For example, as the secondary sash 22 is pivoted open, the first end 104 of the restrictor link 100 pivots about the screw. As the restrictor link 100 pivots and extends out from primary sash 20, the securing lock 112 rotates inside of the accessory receiver 72. The securing lock 112 may include a back rib 118. When the securing lock 112 rotates inside the accessory receiver 72, the back rib 118 contacts the second side wall 76 of the accessory receiver 72. As the back rib 118 pushes against the second side wall 76 during opening of the secondary sash 22, the lip 116 of the securing lock 112 is translated into contact or engagement with the lip channel 82. Thus, when the lip 116 of the securing lock 112 is in engagement with the lip channel 82, the securing lock 112 cannot be removed from the accessory receiver 72. Conversely, when the lip 116 of the securing lock 112 is not in engagement with the lip channel 82, the securing lock 112 can be removed from the accessory receiver 72.

In other embodiments, the securing lock 112 might include a lip 116 extending only from portions of the cap 114 on the securing lock 112. In this embodiment, the securing lock 112 may or may not have a back rib 118. In some embodiments without a back rib, the securing lock 112 is able to be positioned or slide into the accessory receiver 72 when the secondary sash 22 is within a certain, predetermined distance from the primary sash 20. This may be accomplished by providing a portion of the cap 114 without a lip 116. However, as the secondary sash 22 is opened past a predefined distance, the securing lock 112 rotates within the accessory receiver 72 such that the lip 116 moves into engagement with the lip channel 82. Thus, when the secondary sash 22 is opened past a threshold distance from the primary sash 20, the restrictor securing lock 112 cannot be removed from the accessory receiver 72. Embodiments employing the back rib 118 with the non-continuous lip include a similar mechanism for rotating the lip 116 into engagement with the lip channel 82. It will be noted that in some embodiments implementing a back rib, the back rib 118 may provide an off-axis rotation of the securing lock 112 within the accessory receiver 72. This allows for the securing lock 112 to have a narrower profile for insertion into the accessory receiver 72.

The restrictor link body 102 of the restrictor link 100 may include a slim or narrow profile that allows the restrictor link 100 to be seated or concealed between the secondary sash 22 and the primary sash 20 when the secondary sash 22 is in a closed position. The narrow profile may also allow for the appropriate deflection for placement or removal of the securing lock 112 from the accessory receiver 72. The restrictor link body 102 of the restrictor link 100 may also include a slightly curved form. The curved form allows the restrictor link 100 to be engaged with the secondary sash 22, and specifically for the securing lock 112 to stay remain in the accessory receiver 72 during opening and closing of secondary sash 22. Because the secondary sash 22 is positioned on a hinge, the secondary sash 22 will include movement along two axes. The curved form allows the securing lock 112 to follow the accessory receiver 72 as the secondary sash 22 is opened. The curved form may also act as a spring, further contributing to a firm engagement between the securing lock 112 and the accessory receiver 72.

The securing lock 112 includes an engagement with the accessory receiver 72 which allows for the securing lock to optionally be disengaged from the accessory receiver 72 when the prevention of the opening of the secondary sash 22 is no longer desired, for example during cleaning, refinishing, or replacing. The securing lock 112 can be translated away from the accessory receiver 72 when the lip 116 is not engaged with the lip channel 82. This occurs when the secondary sash 22 is partially opened but not opened to the full range permitted by the restrictor link 100, which positions the securing lock 112 in the accessory receiver 72 such that the lip 116 has not been rotated into position with the lip channel 82, or the back rib 118 has not positioned the lip 116 in the lip channel 82 as discussed above. The restrictor link body 102 of the restrictor link 100 may include a pliable or flexible material which can be deflected to translate the securing lock 112 away from and out of the accessory receiver 72, which can be seen in FIG. 10b.

In order for the securing lock 112 to be inserted into or removed from the accessory receiver 72, the securing lock 112 must have a securing lock width 113 that is less than the width 73 of the accessory receiver 72. When considering what the securing lock width 113 includes for purposes of discussion, the securing lock width 113 does not include the back rib 118. Because the back rib 118 is used to translate the lip 116 into engagement with the lip channel 82, in some embodiments, the combined width of the securing lock 112 and the back rib 118 is greater than the accessory receiver width 73, which also may prevent the extension of the restrictor link 100 beyond a predetermined length and/or angle relative to the primary sash 20 or secondary sash 22 when used in connection with a fenestration unit 10. Thus, when the securing lock 112 is to be inserted into or removed from the accessory receiver 72, the back rib 118 must be angled relative to the accessory receiver 72 such that the accessory receiver width 73 is not spanned by the securing lock 112 and the back rib 118, which results in the engagement of the lip 116 with the lip channel 82 when installed or results in the lip 116 and the back rib 118 mechanically interfering with insertion into the accessory receiver 72. In some embodiments, the securing lock width 113 includes the lip 116 and cap 114, which may interfere with insertion and removal.

Once the restrictor link 100 has been disengaged from the secondary sash 22, the secondary sash 22 may pivot open to the full range permitted by the hinge and, in those embodiments allowing for removal from the sash assembly 18, the secondary sash 22 may be fully removed. Once the restrictor link 100 has been disengaged from the secondary sash 22, the second end 106 of the restrictor link 100 is free or not engaged with anything. Thus, the restrictor link 100 is free to rotate and may be stowed near the primary sash 20. When the secondary sash 22 is rotated back into the primary sash 20 and the restrictor link 100 has not been installed or reinstalled back onto the secondary sash 22, the restrictor link interferes with the full closing of the secondary sash 22. This is a result of the dimensions of the securing lock 112 which does not fit between the secondary sash 22 and the primary sash 20 when the securing lock 112 is not installed in the accessory receiver 72 of the secondary sash 22. Thus, the secondary sash 22 can only be fully closed when the securing lock 112 is properly engaged with the secondary sash 22 or when the securing lock 112 has been moved out of the path of the secondary sash 22 which leaves the restrictor link 100 visible and obviously unattached to the secondary sash 22, which prompts a user to properly engage the restrictor link 100 with the secondary sash 22.

The restrictor link 100 may include a variety of lengths depending on the application for which it is being used, including windows and doors of various sizes and shapes. It may be preferable in some embodiments for the restrictor link 100 to have a small length as the window with which it is being utilized is small, and a short restrictor link 100 would prevent the window from rotating beyond a certain distance. In other embodiments, it may be preferable to use a long restrictor link 100 that allows a tall window or door to pivot the secondary sash 22 a predetermined distance from the primary sash 20. Although a variety of materials may be implemented, one exemplary material can include acetal Celcon® M90. However, this is not meant to be limiting, and one of ordinary skill in the art will readily recognize various other materials that may be used in connection with a restrictor link 100.

Push Latch

Figure 11:
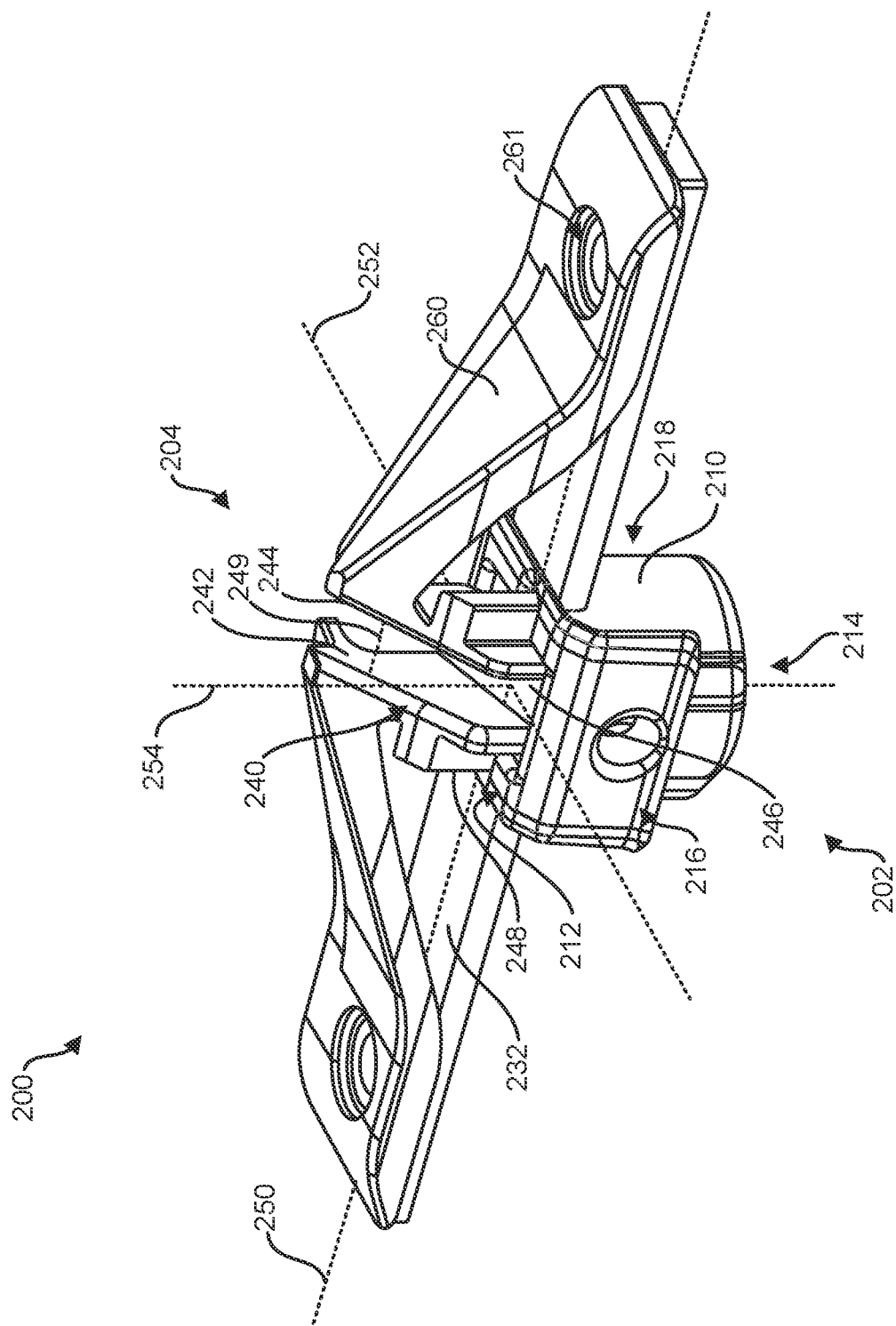
FIG. 11 is a perspective view of a latch system, according to some embodiments of the present disclosure.

Referring now to FIG. 11, a push latch system 200 provides easy unlatching of a fenestration unit 10 implementing a hinged arrangement, such as that described between the primary and secondary sashes 20, 22. The push latch system 200 includes a latch base 202 and a latch 204.

The latch base 202 and the latch 204 may be formed in two separate portions, or the they may be integrated as a single unit. The push latch system 200 permits a secondary sash 22 to be reduced to a closed position while also allowing disengagement from that position by unlatching or disengaging the secondary sash 22 from the primary sash 20.

Figure 13:
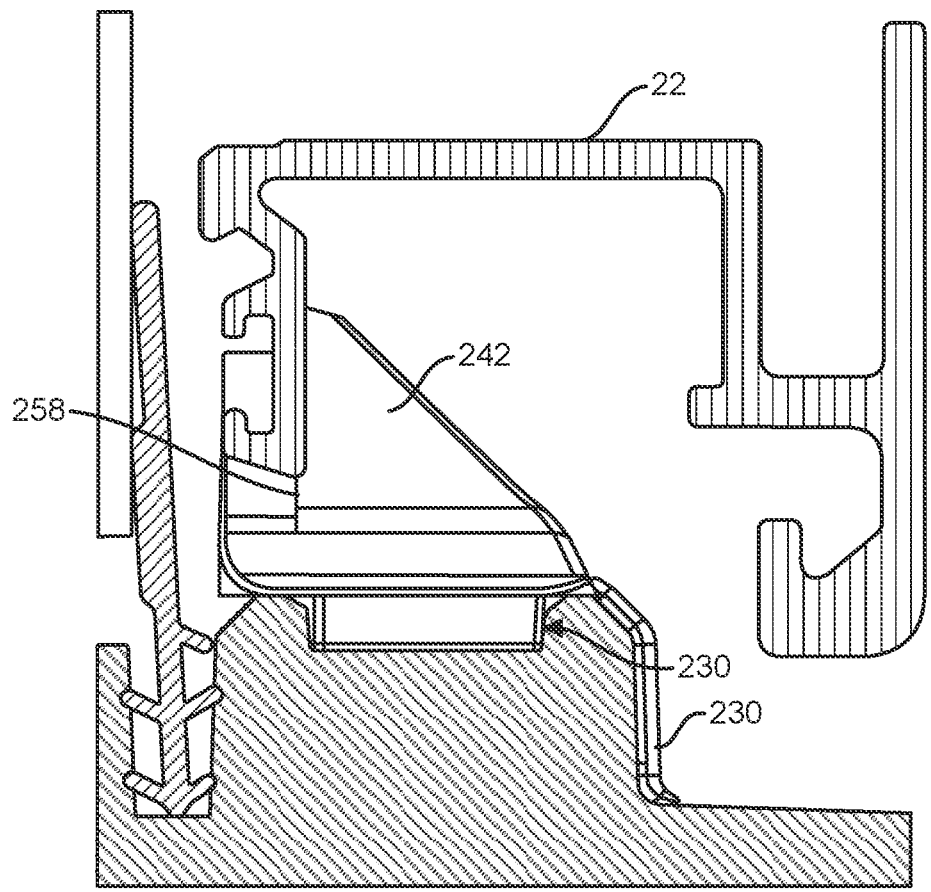
FIG. 13 is a sectional view of a latch system engaged with a sash, according to some embodiments of the present disclosure.
Figure 14:
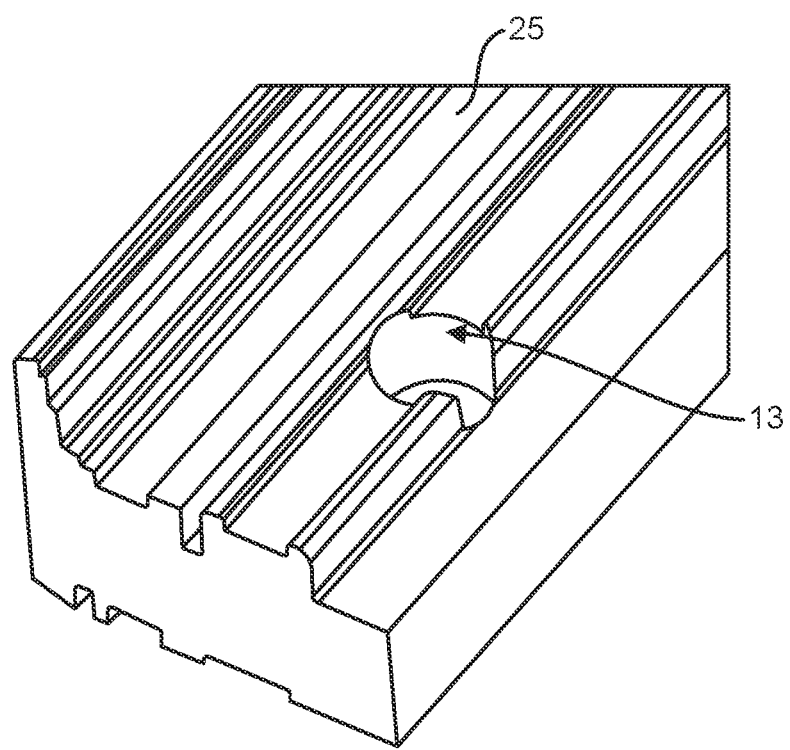
FIG. 14 is a perspective view of a frame operable to retain a latch system, according to some embodiments of the present disclosure.

Referring to FIGS. 11-13, the latch base 202 may engage with and reside on the frame 12. The latch base 202 includes a latch base body 210 having a top side 212, a bottom side 214, a first side 216, and a second side 218. The top side 212 includes a latch base recess 220 disposed about a recess axis 222 and operable to receive the latch 204. The latch base recess 220 is operable to allow the latch 204 to slide or translate within the latch base recess 220 along the recess axis 222. The latch base recess 220 may extend through a substantial portion of the latch base body 210. The latch base 202 may also include a securing aperture 224 disposed through the bottom side 214 and accessible via the latch base recess 220. The securing aperture 224 allows for the latch base 202 to be secured to the primary sash 20 and in some embodiments may allow for air passage through the securing aperture 224 when the latch base 202 is being installed. In some embodiments, the primary sash 20 may include a blind recess 13 (as seen in FIG. 14) shaped to receive the latch base 202. The latch base body 210 rests in the blind recess 13 and may include additional structure for providing enhanced fit and security on the primary sash 20; for example, bezels 230 matching contours of the primary sash 20 and specifically trim work on the primary sash 20.

Referring now to FIG. 12a, the latch base recess 220 further includes channels 226 formed in the interior walls 219 of the latch base body 210. The channels 219 act as a track along which the latch 204 can move within the latch base recess 220. This improves stability of the latch 204 within the latch base 202 during movement and due to various forces that might otherwise impart rotational movement of the latch 204 relative to the latch base 202. The channels 219 may extend from the top side 212 of the latch base body 210 into the latch base recess 220. The channels 226 may terminate at or before the end of the latch base recess 220 such that the channels 226 extend the length of the latch base recess 220 or extend less than the full length of the latch base recess 220.

The latch base 202 may also include a ramp access aperture 228. The ramp access aperture 228 may be defined through the first side 216 of the latch base body 210 about a ramp access axis 229. The ramp access aperture 228 provides access to the latch base recess 220 and to the latch 204 when the latch 204 is engaged with the latch base 202. The ramp access axis 229 is perpendicular to the recess axis 222. The purpose of the ramp access aperture 228 will be described in more detail with regards to the relationship between the latch base 202 and the latch 204.

Referring to FIG. 13, the latch base 202 may further include a contoured bezel 230. The contoured bezel may be formed on the first side 216 of the latch base body 210. The contoured bezel 230 is formed to include a similar form or profile as the primary sash 20 on which the latch base 202 is installed. The contoured bezel 230 may likewise provide increased stability of the latch base 202 in relation to the blind recess 13 and the primary sash 20. The latch base 202 may also include plates 232 (shown in FIG. 11) extending out laterally from the top side 212 of the latch base 202. The plates 232 may be received by the lug recess 28 of the primary sash 20 which provides increased stability of the latch base 202 in relation to the blind recess 13 and the primary sash 20.

Again referring to FIGS. 11-13, the push latch system 200 includes a latch 204. As previously discussed, the latch 204 is used in combination with the latch base 202 to secure the secondary sash 22 to the primary sash 20. The latch 204 is operable to selectively engage the secondary sash 22. More specifically, the latch 204 is operable to engage the first side wall 74 of the accessory receiver 72 of the secondary sash 22. When the latch 204 has engaged the first side wall 74, the secondary sash 22 is unable to pivot away from the primary sash 20.

The latch 204 includes a latch body 240. The latch body 240 may be received by the latch base recess 220 of the latch base 202. The latch body may be disposed about an x-axis 250, a y-axis 252, and a z-axis 254. The latch body 240 may include a first side wall 242, a second side wall 244, and a ramp 246. The first and second side walls 242, 244 of the latch body 240 are parallel to each other and to the z-axis 254 and are separated by a gap 249. The first and second side walls 242, 244 are connected to, coupled to, or extend from the ramp 246, thus the ramp 246 extends between the first and second side walls 242, 244 along the x-axis 250. When the latch body 240 is received by the latch base recess 220 of the latch base 202, the latch body 240 slides down along the recess axis 222 and the first and second side walls 242, 244 of the latch body 240 are parallel to the recess axis 222. This means that the z-axis 205 of the latch body 240 is parallel to or aligned with the recess axis 222 of the latch base 202. The first and second side walls 242, 244 may further include guides 248 which are received by the channels 226 in the latch base recess 220 of the latch base 202. The guides 248 ensure proper placement of the latch body 240 into the latch base recess 220 of the latch base 202. As discussed previously, the guides 248 may also improve stability of the push latch system 200.

The ramp 246 is disposed on the latch body 240 between the first and second side walls 242, 244. The ramp is disposed at an angle greater than zero and less than 90 degrees relative to the y-axis 252 of the latch body 240. More specifically, when viewed from the side such as in FIGS. 12a-12c the ramp 246 may have a lower elevation at a front end 256 of the side walls 242, 244 than at a back end 258 of the side walls 242, 244. When the latch body 240 is installed in the latch base recess 220, the front end 256 of the side walls 242, 244 are oriented toward the ramp access aperture 228. Thus, the ramp 246 has a lower elevation at a portion nearest the ramp access aperture 228 and a higher elevation along the y-axis 252.

The latch body 240 may be under the influence of a spring force which provides a neutral resting position for the latch body 240. The neutral resting position of the latch body 240 relative to the latch base 202 provides an axial gap between the bottom of the latch body 240 and the bottom of the latch base recess 220 of the latch base 202. The latch body 240 may overcome the spring force and translate down into the base recess such that the axial gap between the bottom of the latch body 240 and the bottom of the latch base recess 220 of the latch base 202 decreases. The ramp 246 provides a surface which can translate force asserted along the y-axis 252 into movement of the latch body 240 along the z-axis 254. This translation along the z-axis 254 is a result of the ramp 246 being angled and the latch body 240 being secure along the y-axis 252 when installed in the latch base 202. When the force is no longer applied along the y-axis 252, the spring force will return the latch body 240 to a neutral position when no other obstructions are present.

The spring force may be provided via several methods, structures, and materials as would be recognized be one of ordinary skill in the art. In some embodiments, the spring force may be imparted by spring arms 260. As shown in FIG. 11, spring arms 260 may extend from the latch body 240, and more specifically from the first and second side walls 242, 244. The spring arms 260 may extend from the first and second side walls 242, 244 at angles greater than 0 degrees and less than 90 degrees relative to the x-axis 250. The spring arms 260 may use a variety of materials that provide various levels of resistance, flexibility, and elasticity in order to provide the appropriate spring force for the application. The spring arms 260 may extend from the latch body 240 in the X-Z plane, which is defined by the x-axis 250 and the z-axis 254. When the latch body 240 is depressed into the latch base recess 220, the spring arms 260 flex and provide the spring force. The spring arms 260 flex when under the downward force and against a resulting normal force from the spring arms 260 contacting either the primary sash 20 or the plates 232 of the latch base 202. In some embodiments, the spring arms 260 include spring arm apertures 261 which are used to secure to or engage with the spring arms to either the primary sash 20 or the plates 232 of the latch base 202. In some embodiments, the engagement can be a sliding engagement to allow for the spring arms 260 to splay outward along the x-axis 250 when the latch body 240 is depressed.

As previously discussed, the spring arms 260 extend from the side walls 242, 244 of the latch body 240. The position at which the spring arms 260 and the side walls 242, 244 intersect may be considered the engagement portion 262. However, regardless of the intersection, the engagement portion 262 forms an apex 264 of the latch body 240 that is operable to engage with the secondary sash 22. In some embodiments, the engagement portion 262 may have a truncated or blunted apex 264, such that the engagement portion 262 does not form a sharp edge. The apex 264 may be formed from the angle discussed with regards to the extension of the spring arms from 260 from the first and second side walls 242, 244. The apex 264 may also be formed from a slope of the first and second side walls 242, 244. The first and second side walls 242, 244 may include a similar slope as present on the ramp 246, although they do not have to be disposed at the same angle in all embodiments. For example, the first and second side walls 242, 244 may have sloped edges 266 disposed at an angle greater than zero and less than 90 degrees relative to the y-axis 252 of the latch body 240. More specifically, when viewed from the side such as in FIG. CE the sloped edges 266 may have a lower elevation at a front end 256 of the side walls 242, 244 than at a back end 258 of the side walls 242, 244. When the latch body 240 is installed in the latch base recess 220, the front end 256 of the side walls 242, 244 are oriented toward the ramp access aperture 228. Thus, the sloped edges 266 have a lower elevation at a portion nearest the ramp access aperture 228 and a higher elevation moving away from the ramp access aperture 228 along the y-axis 252.

On the back end 258 of the side walls 242, 244, the side walls 242, 244 may be substantially parallel to the z-axis 254. However, in some embodiments, the back end 258 of the side walls 242, 244 may have notches formed in the side walls 242, 244. In other embodiments, the back end 258 of the side walls 242, 244 may include extensions 268. The extensions 268 may be a part of the spring arms 260 connecting back into the side walls 242, 244 at a different elevation along the z-axis 254 than at the apex 264, as can be seen in FIG. 12a. Regardless, in some embodiments, the side walls 242, 244 include at least a portion 270 along the back end 258 that is parallel with the z-axis 254, or vertical as seen in FIG. 12a. The vertical portion 270 is operable to engage the secondary sash 22. It is understood that the extensions 268 may also engage the secondary sash 22, such that the latch body 240 is maintained in a semi-compressed state when engaged with the secondary sash 22. This means that the latch body 240 may not fully extend back out to a neutral position when engaged. This permits the ramp 246 to be accessible through the ramp access aperture 228 when the latch body 240 is engaged with the secondary sash 22.

Now referring to the method of the push latch system 200 in combination with a fenestration unit 10 (refer to FIGS. 12-15b). The latch base 202 may be mounted on the primary sash 20 of the fenestration unit 10 as previously described. The latch 204 is installed in the latch base 202. Installing the latch 204 into the latch base 202 includes aligning the guides 248 with the channels 226 of the latch base 202. The latch 204 may be translated into a neutral position within the latch base 202. When the latch 204 is in a neutral position, in some embodiments, the latch 204 is positioned in the latch base 202 such that the ramp 246 is inaccessible through the ramp access aperture 228, as seen in FIG. 12a.

The push latch system 200 is operable to engage a secondary sash 22 of a sash assembly 18 as follows. The secondary sash 22 may be moved into a position against the primary sash 20 of the fenestration unit 10. As the secondary sash 22 is translated toward the primary sash 20, an outside edge of the secondary sash 22 will contact the push latch system 200. More specifically, the secondary sash 22 contacts the sloped edges 266 of the latch 204. Because the sloped edges 266 include an incline as described above, the secondary sash 22 exerts a force along the y-axis 252 of the latch 204. Because the sloped edges 266 are angled, that force is translated into z-component along the z-axis 254. This results in movement of the latch body 240 along the z-axis 254. The latch body 240 will continue to seat deeper in the latch base 202, and specifically the latch base recess 220, until the contact edge of the secondary sash 22 is able to pass over the apex 264 of the latch body 240. When the latch body 240 has translated sufficiently into the latch base recess 220, the secondary sash 22 is able to translate between a latched position and an unlatched position. The position of the latch body 240 within the latch base recess 220 where the secondary sash 22 can be moved from open to closed is shown in FIG. 12c and may be considered a transitional position. Once the secondary sash 22 has passed over the apex 264, the spring force from the resilient nature of the spring arms 260 returns the latch body 240 to a neutral position or until another obstruction stops its movement. In some embodiments, when the secondary sash 22 is in a closed position, the latch body 240 is in a latched position, as shown in FIG. 12b. The latched position is may include the latch body 240 being positioned in the latch base recess 220 such that a portion of the ramp 246 is accessible through the ramp access aperture 228. This allows a user to insert an object such as a screw driver in order to engage and activate the ramp 246. Once the latch body 240 has sprung back out, the portion of the side walls 242, 244 along the back end 258 of the side walls 242, 244 engages the secondary sash 22 in a closed configuration (as seen in FIG. 13).

In order to disengage the push latch system 200 from the secondary sash 22 to open the fenestration unit 10, the ramp access aperture 228 may be used. The ramp access aperture 228, as discussed above, provides access to the ramp 246 of the latch 204. The ramp access aperture 228 may be used to insert an object (e.g., the tip of a screwdriver) to apply a force to the ramp 246. Specifically, the force will be generally exerted along the y-axis 252 of the latch 204. Because the ramp 246 is angled, that force is translated into a z-component along the z-axis 254. This results in movement of the latch body 240 along the z-axis 254. The latch body 240 will continue to seat deeper in the latch base 202, and specifically the latch base recess 220. This allows for the secondary sash 22 to move over the apex 264 of the latch body 240 without making contact, allowing the secondary sash 22 to be pivoted or translated away from the primary sash 20. Once the force is no longer applied to the ramp 246, the spring force from the resilient nature of the spring arms 260 returns the latch body 240 to a neutral position or until another obstruction stops its movement. In some embodiments, the sash assembly 18 includes weather seals and other materials that exhibit some elastic properties, as the latch 204 is disengaged from the secondary sash 22, the secondary sash 22 springs away from the primary sash 20.

Thus, in some embodiments, the latch 204 may be positioned relative to the latch base 202 in three positions, including a first, neutral position (FIG. 12a), a second, latched or engaged position (FIG. 12b), and a third, transitional position (FIG. 12c) as described above.

Figure 15A:
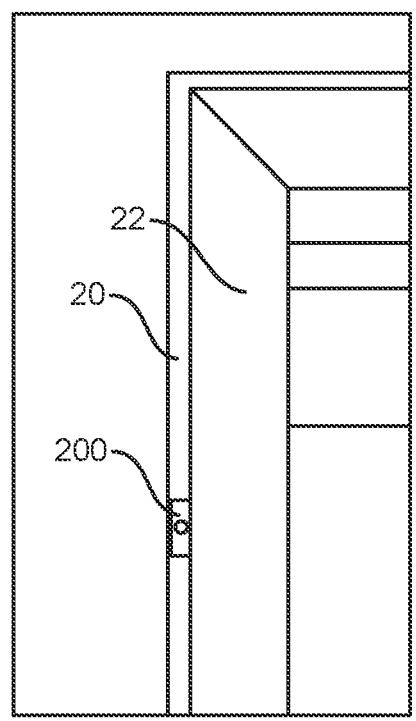
FIGS. 15a and 15b are perspective views of a latch system installed and being used on a fenestration unit.
Figure 15B:
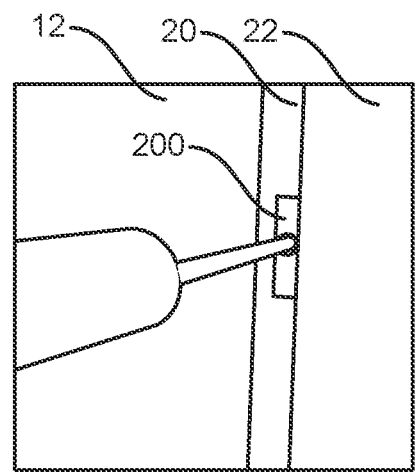

Referring to FIGS. 14-15b, the push latch system 200 may be integrated into a primary sash 20. For example, the primary sash 20 may include a mounting portion where the push latch system 200 may be installed (see FIG. 14). When installed, the push latch system 200 may be substantially concealed in the primary sash 20 (see FIG. 15a). The push latch system 200 may be accessible for unlatching the secondary sash 22 as shown in FIG. 15b.

The use of the disclosed push latch system 200 may provide enhanced security from fenestration units 10 being opened, while maintaining simplicity of operating the push latch system 200. It will be noted that the various elements disclosed herein may include other embodiments that are intended to be captured by this disclosure while maintaining the principles disclosed herein. For example, the ramp access aperture 228 may include a threaded region, such that a bolt or screw must be advanced through the ramp access aperture 228 to contact the ramp 246. However, these various embodiments are all within the scope of this disclosure.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

The following is claimed:

1. A hinge lug comprising:
   a lug body having, a mounting portion, the mounting portion defining a mounting surface,
   a cam portion opposite the mounting portion, the cam portion defining a curved cam surface, and
   a retention portion projecting from the cam portion, the retention portion including a retention lip; and
   a first retention arm extending from the lug body such that the first retention arm is elastically deflectable away from the retention lip;
   wherein the first retention arm includes a first trunk extending from the lug body and a first finger extending from the first trunk, the first trunk and the first finger extending at an acute angle relative to one another.

2. The hinge lug of claim 1, further comprising a second retention arm opposite the first retention arm, the second retention arm being elastically deflectable away from the retention lip, the first retention arm including a first retention finger and the second retention arm including a second retention finger, the first and second retention fingers extending toward one another and being separated by a gap.

3. The hinge lug of claim 1, wherein the first trunk has a decreased thickness at a location where the first finger extends from the first trunk relative to a thickness of the first trunk where the first trunk extends from the lug body.

4. The hinge lug of claim 1, wherein the first retention finger is elastically deflectable between a first, retention position and a second, receiving position.

* * * * *